(12) United States Patent
Kono et al.

(10) Patent No.: US 6,256,145 B1
(45) Date of Patent: *Jul. 3, 2001

(54) METHOD FOR IMPROVING IMAGE CONTRAST WITH LESSENED SCINTILLATION IN A REAR PROJECTION DISPLAY APPARATUS

(75) Inventors: Toshiya Kono, Tokyo; Yasuaki Nakanishi, Kanagawa, both of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/061,943

(22) Filed: Apr. 17, 1998

(30) Foreign Application Priority Data

Apr. 18, 1997 (JP) .................................................. 9-102088

(51) Int. Cl.$^7$ .................................................. G03B 21/60
(52) U.S. Cl. .................................................. 359/457
(58) Field of Search .................................. 359/443, 453, 359/452, 455, 456, 457, 460

(56) References Cited

U.S. PATENT DOCUMENTS

| 4,083,626 | * | 4/1978 | Miyahara et al. | 350/117 |
| 4,725,134 | * | 2/1988 | Ogino | 353/74 |
| 5,196,960 | * | 3/1993 | Matsuzaki et al. | 359/453 |
| 5,477,380 | * | 12/1995 | Watanabe et al. | 359/457 |
| 5,513,036 | * | 4/1996 | Watanabe et al. | 359/457 |
| 5,751,478 | * | 5/1998 | Yoshimura et al. | 359/453 |
| 5,870,225 | * | 2/1999 | Ogino et al. | 359/457 |
| 5,914,809 | * | 6/1999 | Mitani et al. | 359/457 |

* cited by examiner

Primary Examiner—Christopher E. Mahoney
(74) Attorney, Agent, or Firm—Sonnenschein, Nath & Rosenthal

(57) ABSTRACT

A rear projection display apparatus is provided with a screen unit. The screen unit includes a Fresnel lens sheet for gathering incident image light, a lenticular lens sheet for causing the image light gathered by the Fresnel lens sheet to be incident thereon and to be diffused, and having an external-light absorbing layer on the emergent side thereof, and a light diffusing structure for diffusing the image light incident on the lenticular lens sheet. The haze of the light diffusing structure is set at a predetermined value, and the covering ratio per unit area of the external-light absorbing layer is set according to the diffusion property represented by the haze so that it is smaller than the case in which no light diffusing structure is employed.

15 Claims, 8 Drawing Sheets

EMERGENT ANGLE (deg)

METHOD FOR IMPROVING IMAGE CONTRAST WITH LESSENED SCINTILLATION IN A REAR PROJECTION DISPLAY APPARATUS

BACKGROUND OF THE INVENTION

1. Field of the Invention

The present invention relates to a rear projection display apparatus and a screen unit that are able to project a magnified image from an image source onto a transmissive screen via a projection lens.

2. Description of the Related Art

A well-known type of rear projection display apparatus projects image light emitted from an image source formed of a CRT (Cathode Ray Tube) and an optical system using optical elements, such as a liquid crystal panel, onto a transmissive screen via a projection lens to form a magnified image thereon.

Since a screen unit in such a rear projection display apparatus is required to have various functions for projecting a good image, and includes in combination a plurality of screens having specific functions.

In general, the screen unit includes a Fresnel lens sheet located on the side of the image source, and a lenticular lens sheet located at the rear of the Fresnel lens sheet, as disclosed in, for example, Japanese Unexamined Patent Publication No. 6-6739.

FIG. 7 is a perspective view showing the structure of a screen unit 30 including a Fresnel lens sheet 31, a lenticular lens sheet 32, and the like.

Image light projected by a projection lens (not shown), which is placed after the aforesaid CRT or optical system, is gathered and directed toward a viewer by Fresnel lenses in the Fresnel lens sheet 31, which corrects variations in luminance from point to point on the viewed screen.

The lenticular lens sheet 32 placed behind the Fresnel lens sheet 31 contains a light diffusing agent therein. Image light is transmitted through the lenticular lens sheet 32 while being diffused by the light diffusing agent, thereby projecting an image. The lenticular lens sheet 32 also controls the light diffusion properties in the horizontal and vertical directions, and causes the light to converge by the lensing action of a plurality of lenticular lens elements located on the incident side.

Furthermore, external-light absorbing layers 32a are formed in vertical stripes at portions on the emergent side of the lenticular lens sheet 32 other than portions where the light converges so that they cover predetermined areas on the emergent side, thereby reducing the influence of external light from outside the display apparatus without blocking image light to be projected onto the screen, and improving the image contrast.

Although it is only necessary to increase the covering ratio of the external-light absorbing layers 32a in order to reduce the influence of external light and to improve the image contrast, if the covering ratio exceeds a predetermined value, image light is blocked by the external-light absorbing layers 32a, and is decreased in amount. Therefore, in a rear projection display apparatus using a CRT as an image source, the covering ratio of the external-light absorbing layers 32a is limited to, for example, about 40% according to the structure of the optical system and the like.

In a rear projection display apparatus using three CRTs corresponding to three colors R, G, and B, as shown in FIG. 8, image lights of three colors emitted from a red CRT 40R, a green CRT 40G, and a blue CRT 40B are magnified and projected onto a screen unit 30, which is composed of a Fresnel lens, a lenticular lens and the like, via projection lenses 41R, 41G, and 41B, respectively.

Since the CRTs 40R, 40G, and 40B are required to be placed so that their centers are opposed to about the center of the screen unit 30, as is shown, the CRT 40G is placed in front of the screen unit 30, and the CRTs 40R and 40B on both sides of the CRT 40G are placed at an angle of, for example, about 10° with respect to the screen unit 30. Thereby the colored lights are incident on the screen unit 30 at different angles and are not parallel to each other in front of the screen unit 30, and therefore, the covering ratio is set at about 40% in consideration of these circumstances, as mentioned above.

In recent years, a rear projection display apparatus has also been known that uses as an image source an optical system composed of a liquid crystal panel and the like and that magnifies and projects an image formed by the optical system by a single projection lens.

FIG. 9 is a schematic view of the rear projection display apparatus in which an optical system 51 composed of three liquid crystal panels corresponding to colors R, G, and B and a screen unit 30 are placed in a housing 50.

An image formed by the optical system 51 located in the lower part of the housing 50 is magnified by a projection lens 52, reflected by a mirror 53 as shown by the arrows, and reaches the screen unit 30.

The configuration of the optical system 51 will now be described with reference to FIG. 10.

In a light source 55, a lamp 56 formed of, for example, a metal halide lamp, is placed at the focal point of a parabolic mirror, and light almost parallel to the optical axis of the parabolic mirror is emitted from an opening of the lamp 56. Unnecessary beams, in the infrared and ultraviolet regions, of the light emitted from the light source 55, are blocked by an UV-IR cutting filter 57, and only the effective beams are directed to a lens array section 58.

The lens array section 58 includes optical elements, such as a PBS (Polarizing Beam Splitter), and it polarizes P-polarized light and S-polarized light emitted from the light source 55 and outputs, for example, P-polarized light.

That is, the lens array section 58 allows the light from the light source 55 passed through the UV-IR cutting filter 57 to be polarized into P-polarized light and to be effectively and uniformly radiated onto effective apertures of liquid crystal panels 62, 63, and 68.

Between the lens array section 58 and the effective apertures of the liquid crystal panels 62, 63, and 68, dichroic mirrors 59 and 60 are placed to separate the light emitted from the light source 55 into lights of red, green, and blue light.

In this example shown in FIG. 10, the dichroic mirror 59 first reflects red light R, and transmits green light G and blue light B. The red light R reflected by the dichroic mirror 59 is deflected by 90° by a mirror 61, and enters the red liquid crystal panel 62.

On the other hand, the green light G and the blue light B transmitted through the dichroic mirror 59 are separated by the dichroic mirror 60. That is, the green light G is reflected, deflected by 90°, and directed to the green liquid crystal panel 63. The blue light B passes through the dichroic mirror 60, travels straight, and is directed to the blue liquid crystal panel 68 via a relay lens 64, a mirror 65, a relay lens 66, and a mirror 67.

The colored light modulated by the liquid crystal panels 62, 63, and 68 is synthesized by a crossed dichroic prism 69 serving as a light synthesizing element. The crossed dichroic prism 69 is composed of a reflecting plane 69a and a reflecting plane 69b. The red light R and the blue light B are reflected toward the projection lens 52 by the reflecting plane 69a and the reflecting plane 69b, respectively, and the green light G is transmitted through the reflecting planes 69a and 69b. Therefore, the R, G, and B light is combined, and magnified and projected by the projection lens 52 onto the screen unit 30 shown in FIG. 9.

In such a rear projection display apparatus, since image light is magnified and projected by the single projection lens 52, it enters the screen unit 30 from one direction. Therefore, it is possible to set the covering ratio of the external-light absorbing layers 32a to, for example, about 80%, which is considerably higher than that of the aforesaid display apparatus using three CRTs shown in FIG. 8.

In order to maximize the covering ratio of the external-light absorbing layers 32a without blocking image light, as disclosed in, for example, Japanese Examined Patent Publication No. 7-19029, lens elements for constituting the lenticular lens sheet 32 are each shaped like a part of a longitudinal convex surface of an ellipsoid whose eccentricity is equal to the reciprocal of the refractive index of the lens medium, and each external-light absorbing layer 32a is formed at the focal point of the ellipsoid.

In the rear projection display apparatus shown in FIGS. 9 and 10, image light can be projected by the single projection lens 52 in one direction. Since the light beam emitted from the image source is intense and narrow, however, light diffused by the aforesaid light diffusing agent contained in the lenticular lens sheet 32 sometimes causes interference. This is a phenomenon called scintillation in which a part of the image projected on the screen shines brightly, which significantly reduces the quality of the image.

In order to lessen scintillation, a light diffusing structure for diffusing light may be placed at a position closer to the projection lens 52 than to the lenticular lens sheet 32, as disclosed in, for example, Japanese Unexamined Patent Publication No. 8-313865 and the like. This light diffusing structure is formed by mixing a light diffusing agent into the Fresnel lens sheet 31, or placing a separate light diffusing sheet before the Fresnel lens sheet 31.

Scintillation appears more pronouncedly as the light beam from the image source becomes narrower and intenser. Therefore, it is necessary to set the haze, which represents the light diffusion property of the light diffusing structure, according to the design of the optical system 51 affecting the light beam, such as the lamp output, the luminous characteristics, the sizes of the lens array and the liquid crystal panel and the f-number of the projection lens, the screen size of the screen unit 30, and the like. For example, the haze is set lower as the screen size of the screen unit 30 increases, and is set higher as the screen size decreases.

If the haze of the light diffusing structure is set lower than required, glare appears on the screen owing to scintillation. On the other hand, when the haze is set higher than required, light is excessively diffused, and the peak luminance of the image is impaired. Therefore, the haze is set within the range of, for example, about 60% to 80% according to the configuration of the optical system 51.

The haze is the proportion of the diffused transmittance to the total light transmittance that is measured by using an integrating sphere beam-transmittance measuring instrument according to Section 6.4 of the Japanese Industrial Standards K7105. For example, the haze of 60% means that 60% of light is diffused and emitted outwardly from the center.

For example, when a light diffusing structure with a haze ranging from 60% to 80% is used for the lenticular lens sheet 32 on which the external-light absorbing layers 32a are formed at a covering ratio of 80%, image light diffused by the light diffusing structure is blocked by the external-light absorbing layers 32a, and the amount of image light to be transmitted through the screen unit 30 is reduced.

That is, if the optimum covering ratio is not selected for the haze that is set according to the screen size of the screen unit 30 and the configuration of the optical system 51, the image obtained is not the same as the original one.

SUMMARY OF THE INVENTION

The present invention has been made to solve such problems, and has as an object the provision of a rear projection display apparatus that lessens scintillation and improves image contrast.

According to an aspect of the present invention, there is provided an improved rear projection display apparatus including an image source for forming and projecting an image, and a transmissive screen unit, the screen unit having a Fresnel lens sheet for gathering image light projected from the image source, a lenticular lens sheet for causing the image light gathered by the Fresnel lens sheet to be incident thereon and to be diffused, and having an external-light absorbing layer on the emergent side, and a light diffusing structure for diffusing the image light incident on the lenticular lens sheet. A haze of the light diffusing structure is set at a predetermined value, and a covering ratio per unit area of the external-light absorbing layer is set according to the diffusion property represented by the haze.

According to another aspect of the present invention, there is provided a screen unit including a Fresnel lens sheet for gathering incident image light, a lenticular lens sheet for causing the image light gathered by the Fresnel lens sheet to be incident thereon and to be diffused, and having an external-light absorbing layer on the emergent side thereof, and a light diffusing structure for diffusing the image light incident on the lenticular lens sheet. A haze of light diffusing structure is set at a predetermined value and the covering ratio per unit area of the external-light absorbing layer is set according to the diffusion property represented by the haze.

According to the present invention, the covering ratio per unit area of the external-light absorbing layer can be set according to the haze (light diffusion property) of the light diffusing structure that is placed closer to the image source than to the lenticular lens sheet for constituting the screen unit.

As a result, the covering ratio can be maximized within the permissible range according to the divergence angle of image light that is incident on the lenticular lens sheet.

DESCRIPTION OF THE PREFERRED EMBODIMENT

Figure 9:
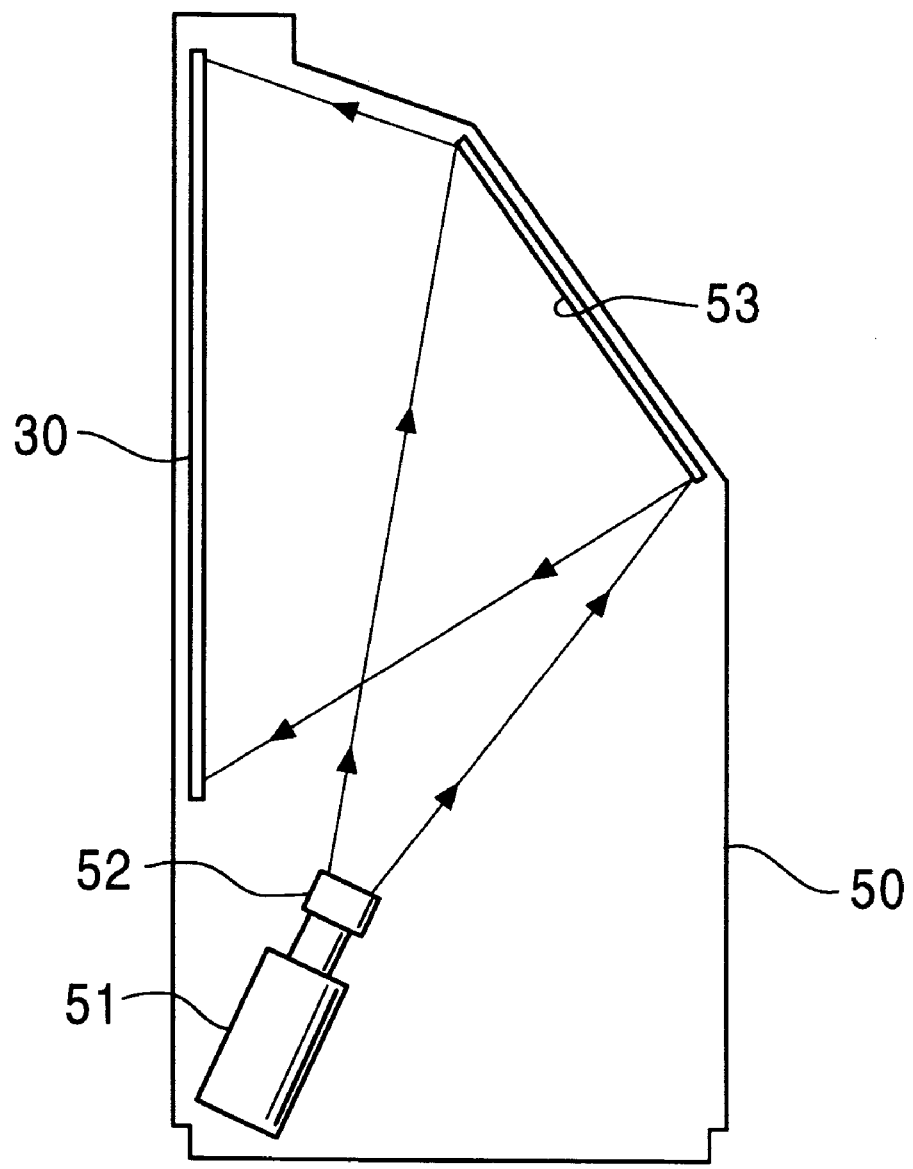
FIG. 9 is an explanatory view of a rear projection display apparatus that includes an optical system using liquid crystal panels.
Figure 10:
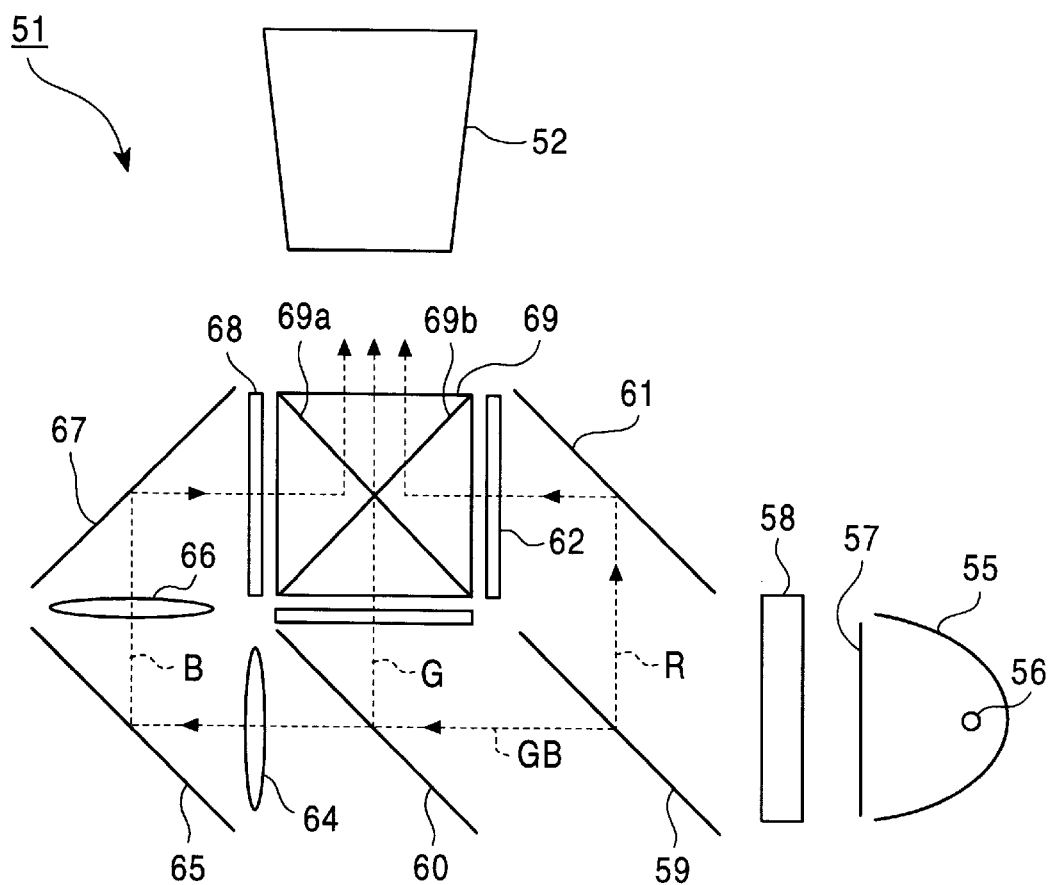
FIG. 10 is an explanatory view of the optical system shown in FIG. 9.

A preferred embodiment of the present invention will be described below with reference to the attached drawings. A display apparatus of this embodiment synthesizes image light of colors R, G, and B modulated by three liquid crystal panels, and projects the synthesized light via a single projection lens, in a similar manner to the conventional art described above with reference to FIGS. 9 and 10.

Figure 1:
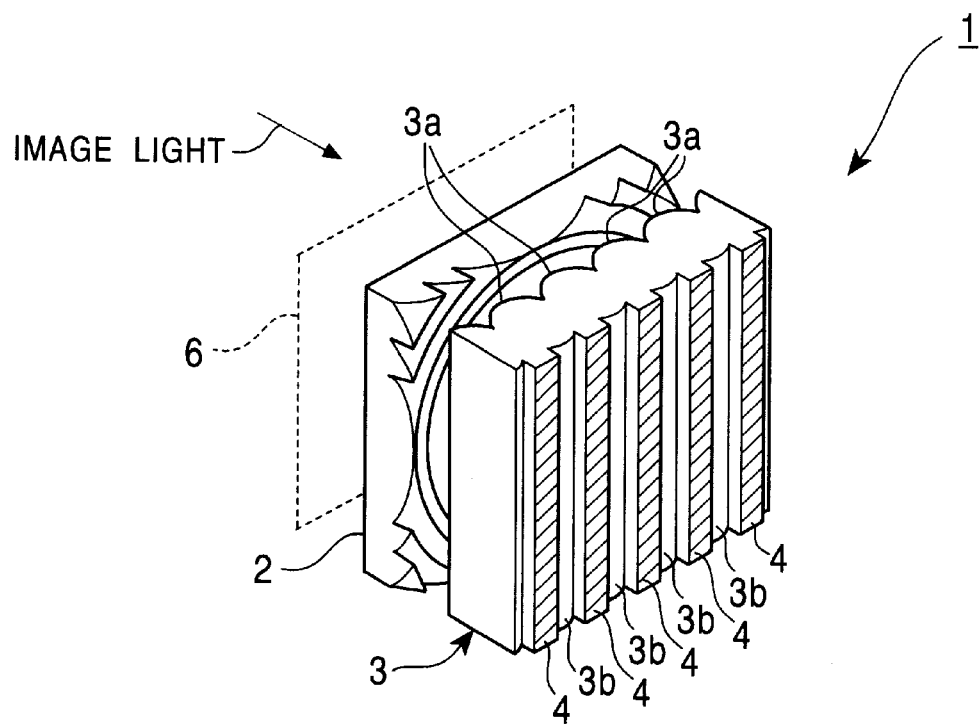
FIG. 1 is a schematic perspective view showing the structure of a screen unit according to an embodiment of the present invention.
Figure 7:
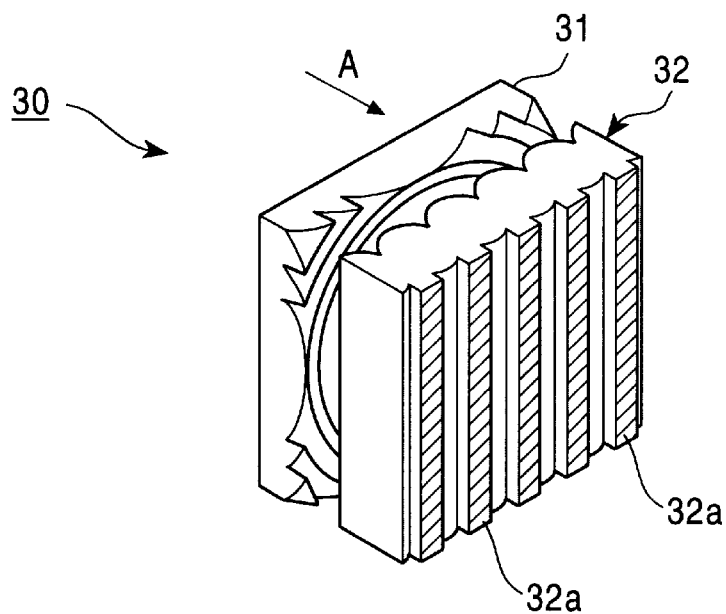
FIG. 7 is a schematic perspective view showing the structure of a conventional screen unit.
Figure 8:
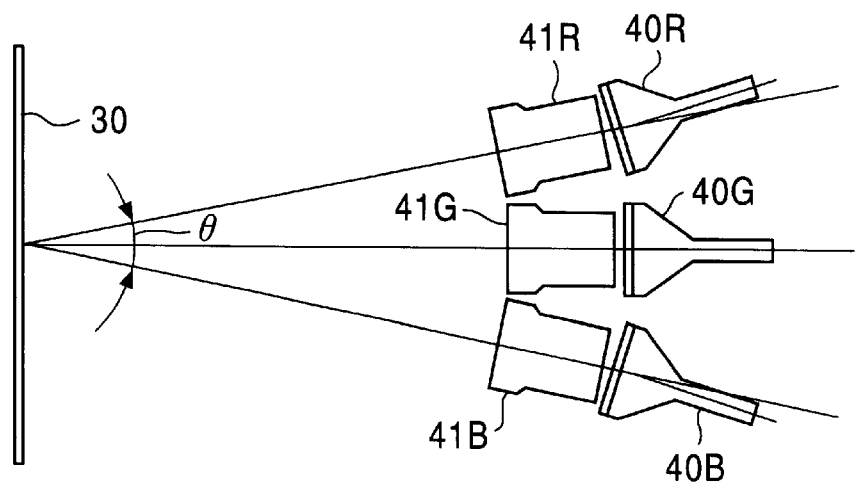
FIG. 8 is an explanatory view of a rear projection display apparatus using three CRTs.

FIG. 1 is a schematic perspective view showing the structure of a transmissive screen unit employed in the display apparatus of this embodiment. Referring to FIG. 1, a screen unit 1 includes, for example, a Fresnel lens sheet 2 and a lenticular lens sheet 3. The Fresnel lens sheet 2 of this embodiment corresponds to the aforesaid Fresnel lens sheet 31 shown in FIG. 7, and contains a light diffusing agent having a predetermined haze (for example, about 60% to 80%) that is set according to the influence of scintillation on an image.

The lenticular lens sheet 3 has lens elements 3a on the incident side and lens elements 3b on the emergent side, which are formed in predetermined forms. Furthermore, the lenticular lens sheet 3 contains a light diffusing agent for forming an image by diffusing and transmitting image light gathered by the Fresnel lens sheet 2. This makes it possible to control the horizontal and vertical light diffusion properties of incident image light, and to converge the light by the lensing action of the plurality of lens elements 3a on the incident side that are, for example, aspherical. The shapes of the incident-side lens elements 3a and the emergent-side lens elements 3b will be described in detail later.

Furthermore, external-light absorbing layers 4 are provided in portions on the emergent surface other than portions where light converges so that they cover predetermined areas of the emergent surface. This makes it possible to reduce the influence of external light from outside of the display apparatus without blocking image light to be projected onto the screen and to improve the image contrast. In the present invention, the covering ratio per unit area of the external-light absorbing layers 4 is set at, for example, about 65% to 75% according to the haze of the diffusing agent mixed in the Fresnel lens sheet 2.

While the light diffusing agent is mixed in the Fresnel lens sheet 2 of the screen unit 1 in this embodiment, for example, a light diffusing sheet 6 may be separately placed before the Fresnel lens sheet 2, as shown by a broken line in FIG. 1.

Next, a description will be given of the shape of the lens elements 3a and 3b that constitute the lenticular lens sheet 3 employed in this embodiment.

Figure 2:
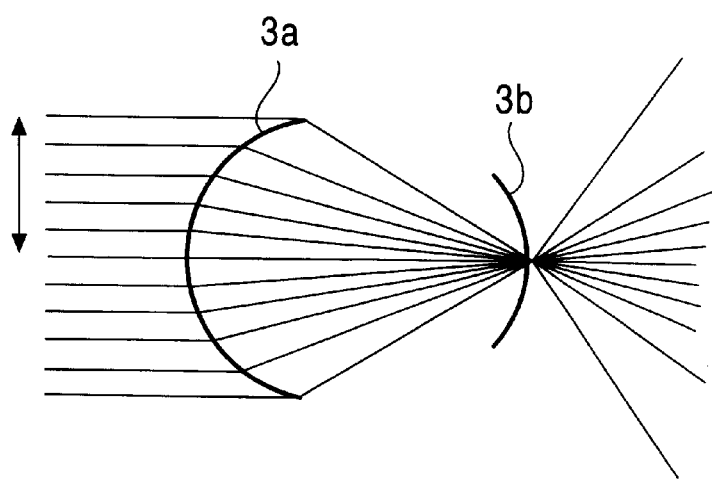
FIG. 2 is a schematic view showing the shape of lens elements that constitute a lenticular lens sheet of the screen unit shown in FIG. 1.

FIG. 2 is a schematic diagram showing the shapes of one of the lens elements 3a and one of the lens elements 3b in the lenticular lens sheet 3, and the optical path of image light to be transmitted through these lens elements 3a and 3b.

The shapes of the lens elements 3a and 3b are aspherical as mentioned above, and are expressed by the following general formula:

$$Z = \frac{CH^2}{1 + \sqrt{1-(K+1)C^2H^2}} + \sum_{i=2}^{5} A_i H^{2i} \qquad \text{(Formula 1)}$$

where Z is the sag, H is the distance from the center, K is the conic constant, C is the curvature at the optical axis, and $A_2$ to $A_5$ are constants.

When $K_1$ represents the conic constant of the incident-side lens element 3a, $C_1$ represents the curvature of the incident-side lens element 3a at the optical axis, $K_2$ represents the conic constant of the emergent-side lens element 3b, $C_2$ represents the curvature of the emergent-side lens element 3b at the optical axis, and T represents the lens-to-lens distance between the incident-side lens element 3a and the emergent-side lens element 3b when a half pitch of the incident-side lens elements 3a is taken as 1, in the above Formula 1, the lenses employed in this embodiment are shaped so that $K_1$ is $-0.45$, $C_1$ is 1.2, $K_2$ is $-1.2$, $C_2$ is $-1.3$, T is 2.4, and $A_2$ to $A_5$ are all 0.

The diffusion property of the Fresnel lens sheet 2 will now be described.

Figure 3:
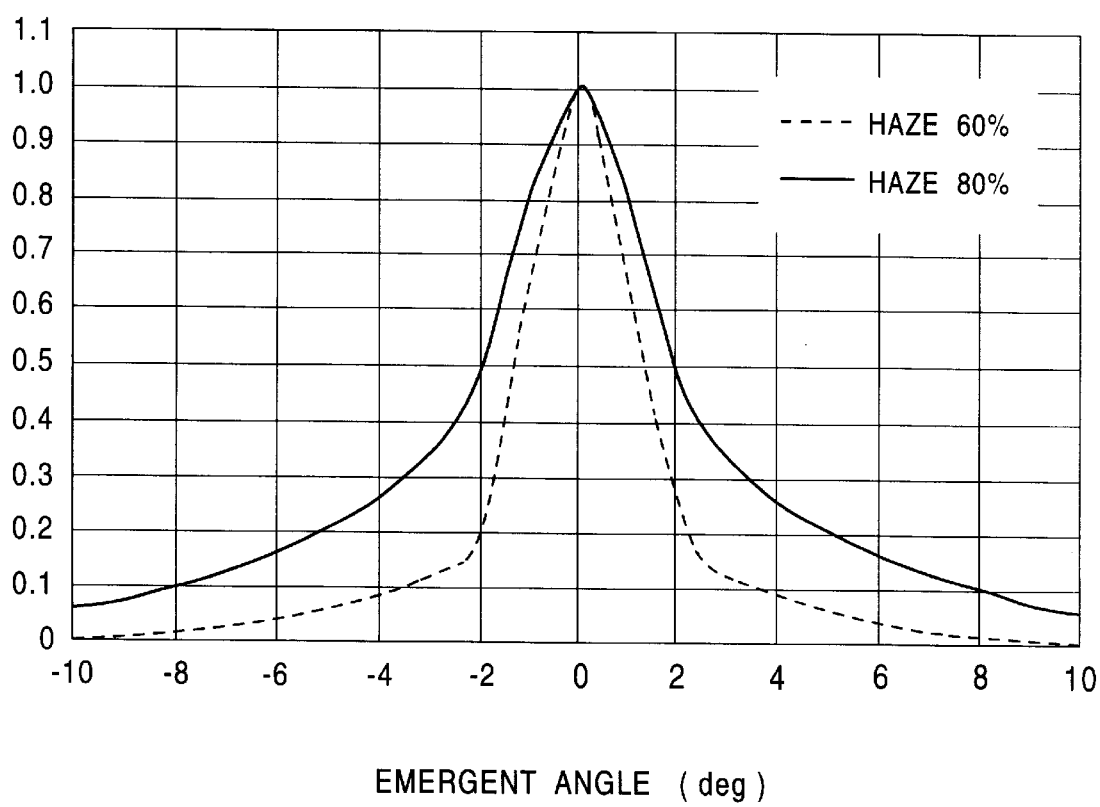
FIG. 3 is a graph showing the difference in light diffusion property depending on the haze.

FIG. 3 shows the diffusion properties in the case where a light diffusing agent with a haze of 60% is used (shown by the broken line), and the case where a light diffusing agent with a haze of 80% is used (shown by the solid line). The vertical axis shows the luminance, and the horizontal axis shows the emergent angle (deg) of transmitted light. In FIG. 3, the peak value of the luminance on the emergent side (the emergent angle is about 0°) is normalized as 1. The haze, which is set according to the screen size of the screen unit 1 and the design of the optical system as mentioned above, is set within the range of 60% to 80% in this embodiment.

When the haze is 80%, as shown by the solid line in FIG. 3, the emergent angle at which the luminance of the transmitted light is less than one-tenth (0.1) of the peak value of 1 is ±8°. When the haze is 60%, as shown by the broken line in FIG. 3, the emergent angle at which the luminance is lower than one-tenth (0.1) of the peak value is ±3.6°. This reveals that the incident light emerges while being diffused to an extent depending on the haze. If the luminance changes below the level of one-tenth (0.1), the change cannot be noticed by the naked eye. Therefore, a change in luminance below such a level is negligible. Accordingly, while the reference luminance is one-tenth in this embodiment, it may be below one-tenth or above one-tenth.

In this way, it can be thought that the light to be incident on the lenticular lens sheet 3 is spread through an angle of ±8° when the light diffusing agent has a haze of 80%, and through an angle of ±3.6° when the light diffusing agent has a haze of 60%.

Accordingly, the present invention achieves efficient absorption of external light and transmission of image light by setting the covering ratio per unit area of the external-light absorbing layers 4 (hereinafter referred to merely as the covering ratio) according to the haze.

The covering ratios of the external-light absorbing layers 4 according to two different hazes (80% and 60%) will now be described as examples.

Figure 4:
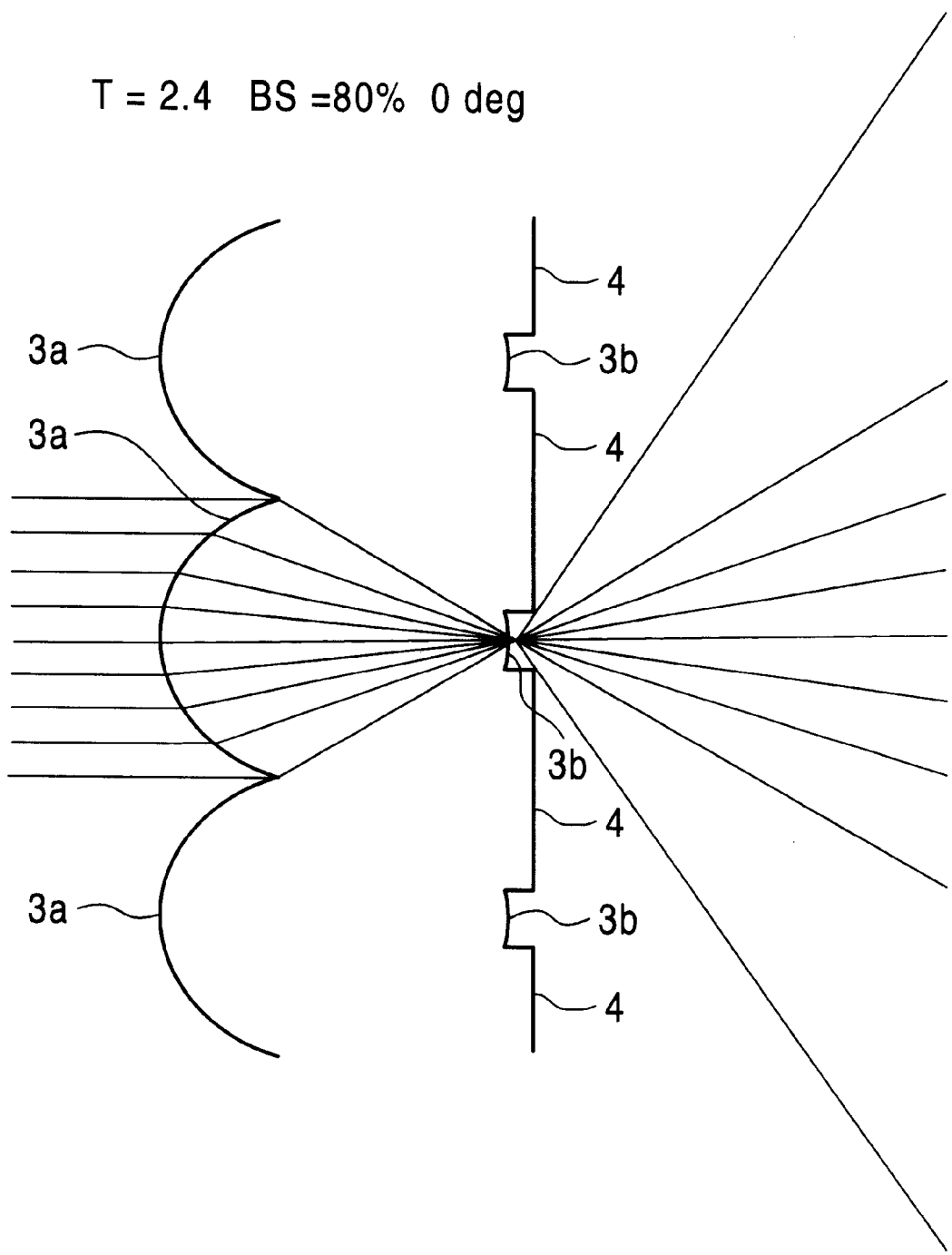
FIG. 4 is a diagram explaining the covering ratio of an external-light absorbing layer when no light diffusing agent is mixed in a Fresnel lens.

First, the optical path, in which light incident on the lenticular lens sheet 3 from the vertical direction is diffused in the horizontal direction without passing through any light diffusing structure, will be simulated with reference to FIG. 4. In this example, the lens-to-lens distance T between the lens element 3a and the lens element 3b is set at 2.4.

When no light diffusing structure is used, image light enters the lens element 3a at about 0° without being diffused, and emerges from the lens element 3b along the optical paths shown in FIG. 4. From a production viewpoint, the lenticular lens sheet 3 is formed so that the surface of each external-light absorbing layer 4 projects from the top of the emergent face, for example, by about 0.1 mm. Therefore, even when the covering ratio is set at about 80%, it is possible to sufficiently transmit the image light, and to sufficiently block external light.

In the present invention, image light is made incident on the lenticular sheet 3 after being diffused by a light diffusing structure, in consideration of scintillation and other problems. If the haze is set in this state, the diffused image light is absorbed by the external-light absorbing layers 4. That is, if the covering ratio is fixed while not considering different hazes, image light is blocked by the external-light absorbing layers 4, image quality is degraded, and the image obtained is not the same as the original one.

Accordingly, the covering ratio of the external-light absorbing layers 4 is set according to the haze in order to reduce scintillation and to obtain a good high-contrast image.

Figure 5:
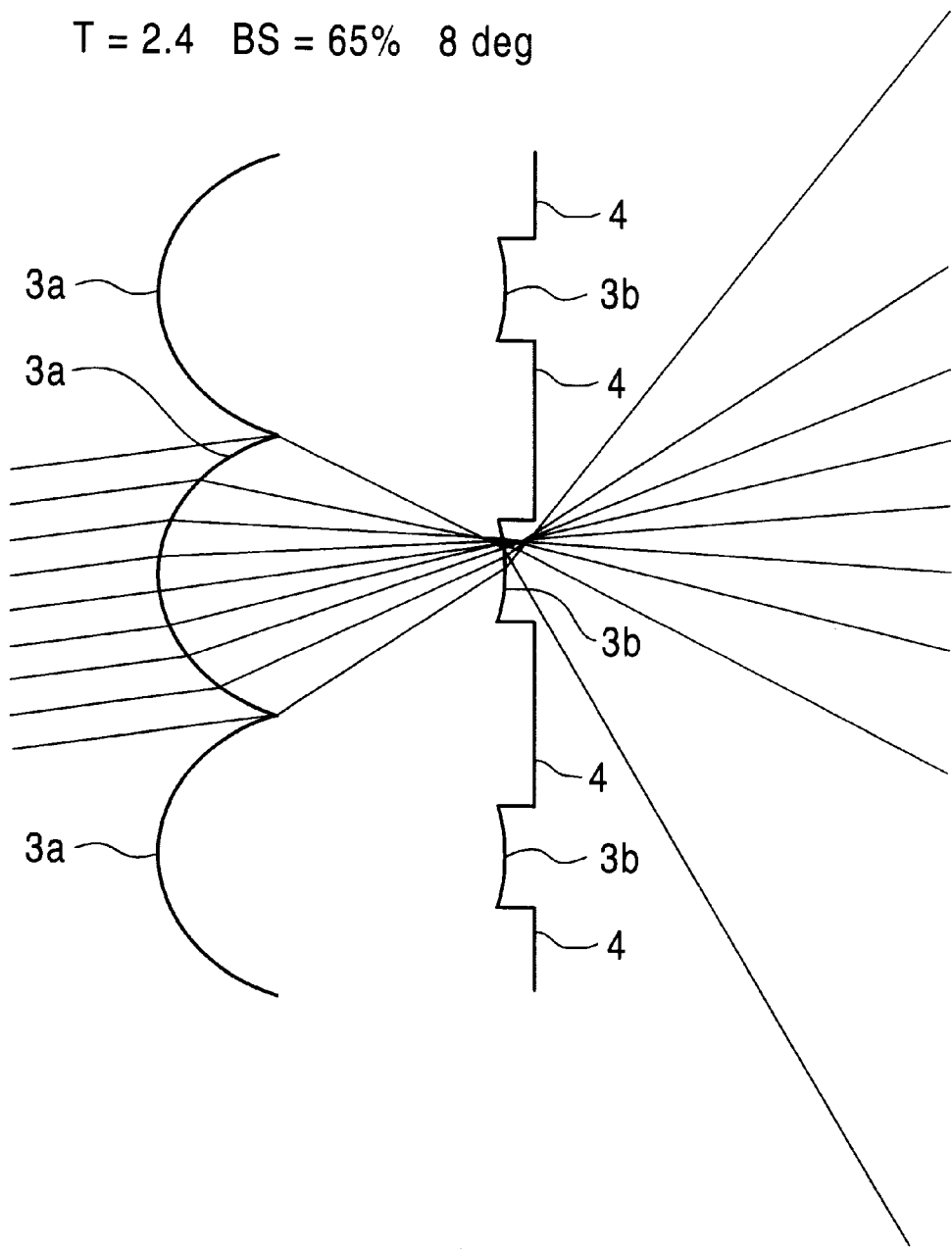
FIG. 5 is a diagram explaining the covering ratio of the external-light absorbing layer when light diffusing agent with a haze of 80% is mixed in the Fresnel lens.

FIG. 5 is a schematic view showing the covering ratio of the external-light absorbing layer 4 when the haze is set at 80%, and shows only the optical path of image light that enters the lenticular lens sheet 3 at an incident angle of 8°.

When the haze is set at 80%, light beams (image light) emerging at angles below 8° are regarded as visually effective (the luminance is above one-tenth of the peak luminance), as mentioned above. Therefore, in order that image light incident on the lens element 3a at an incident angle of 8° emerges from the lens element 3b without being blocked, the covering ratio of the external-light absorbing layers 4 is set based on the optical path shown in FIG. 5. In this embodiment, when the covering ratio of the external-light absorbing layers 4 is 65%, the external-light absorbing layers 4 do not block image light emerging at an angle below at least 8°, i.e. light that is regarded as effective.

Figure 6:
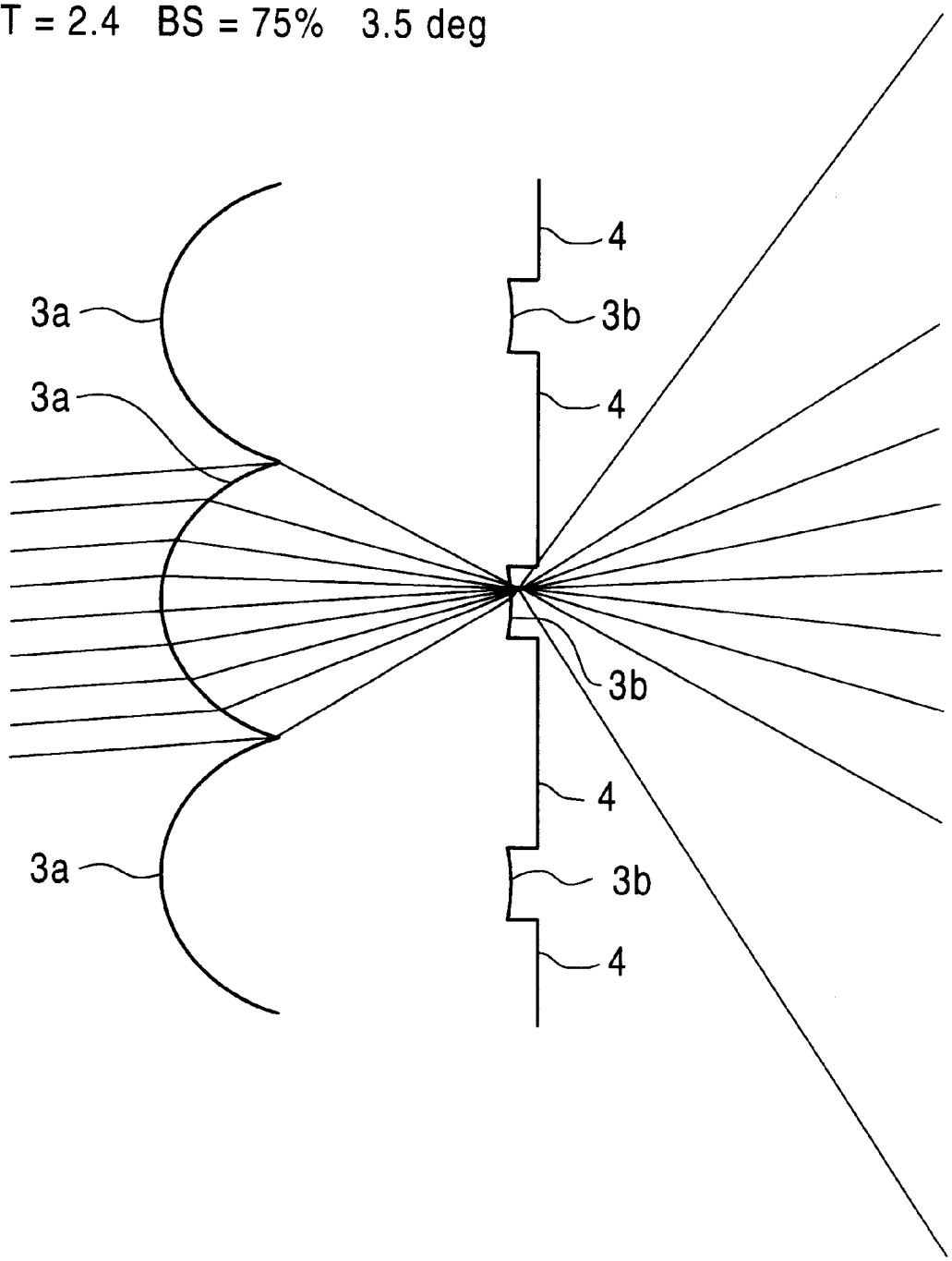
FIG. 6 is a diagram explaining the covering ratio of the external-light absorbing layer when light diffusing agent with a haze of 60% is mixed in the Fresnel lens.

FIG. 6 is a schematic view showing the covering ratio of the external-light absorbing layers 4 when the haze is set at 60%, and shows only the optical paths of image light that enters the lenticular lens sheet 3 at an incident angle of 3.6°.

When the haze is set at 60%, light beams (image light) emerging at angles below 3.6° are regarded as visually effective (the luminance is above one-tenth of the peak luminance), as mentioned above. Therefore, in order that image light incident on the lens element 3a at an angle of 3.6° emerges from the lens element 3b without being blocked, the covering ratio of the external-light absorbing layers 4 is set based on the optical paths shown in FIG. 6. In this embodiment, when the covering ratio of the external-light absorbing layers 4 is 75%, the external-light absorbing layers 4 do not block image light emerging at an angle below at least 3.6°, i.e. light that is regarded as effective.

Such setting of the covering ratio of the external-light absorbing layers 4 according to the incident angle of image light with respect to the lenticular lens sheet 3, that is, the haze of the light diffusing agent, makes it possible to sufficiently transmit image light and to obtain a good image.

Since the covering ratio in the examples shown in FIGS. 5 and 6 is set lower than that of the example shown in FIG. 4, the contrast may be lowered by entry of external light owing to the position of the display apparatus and the like. Image quality can, however, be improved by the reduction of scintillation.

In this embodiment, it is assumed that light is incident on the lenticular lens sheet 3 from the perpendicular direction by the lensing action of the Fresnel lens sheet 2 when the influence of light diffusion by the light diffusing agent mixed into the Fresnel lens sheet 2 is neglected. Image light may, however, enter the lenticular lens sheet 3 at an arbitrary angle depending on the shape of the Fresnel lens. In this case, the optical axes of the lens elements 3a and 3b in the lenticular lens sheet 3 are set out of alignment according to the incident angle. Such a lenticular lens sheet in which the optical axes of lens elements are out of alignment is disclosed in, for example, Japanese Examined Patent Publication No. 3-60104. By thus setting the optical axes of the incident-side lens element and the emergent-side lens element out of alignment, the transmission efficiency of image light can be improved without changing the covering ratio.

While the hazes are set at 60% and 80% as examples in this embodiment, the covering ratio of the external-light absorbing layers 4 can be set according to any haze that is set in accordance with the screen size of the screen unit 1 and the design of the optical system.

Although various minor modifications might be suggested by those skilled in the art, it should be understood that our wish to embody within the scope of the patent warranted hereon all such modifications as reasonably and properly come with the scope of our contribution to the art.

As mentioned above, according to the present invention, the covering ratio per unit area of the external-light absorbing layers is set according to the haze (light diffusion property) of the light diffusing structure to be placed closer to the image source than to the lenticular lens sheet for constituting the screen unit. Consequently, even if the haze varies depending on the specifications, such as the screen size of the screen unit and the design of the optical system, it is possible to achieve the maximum permissible covering ratio according to the divergence angle of image light.

Since scintillation can be reduced by the light diffusing means and external light can be blocked to the full, it is possible to reduce problems, such as scintillation, and to display a high-contrast bright image.

What is claimed is:

1. A method for providing an improved rear projection display apparatus, comprising the steps of:

providing an image source including a single projection lens for projecting a desired image as an image light;

providing a transmissive screen unit including a Fresnel lens for gathering the image light, a lenticular lens for causing the image light gathered by said Fresnel lens to be incident thereon and having an external-light absorbing layer on an emergent side thereof, and a light diffusing structure for diffusing the image light incident on said lenticular lens;

designing said light diffusing structure to have a light diffusion property representing a desired haze in a range between 60% and 80% which reduces scintillation within an allowable limit; and setting a covering ratio per unit area of said external-light absorbing layer on said lenticular lens based on a diffusion property represented by said desired haze, so that rays from said lenticular lens, which is within an emergent angle at which luminance is a predetermined luminance, can pass through.

2. The method according to claim 1 wherein said predetermined luminance is approximately one-tenth of peak luminance.

3. The method according to claim 1 including the step of creating said light diffusing structure and setting said desired haze by mixing a light diffusing agent in said Fresnel lens.

4. The method according to claim 1 including the step of forming said light diffusing structure and setting said desired haze by employing a light diffusing sheet placed before said Fresnel lens.

5. The method according to claim 1 wherein said covering ratio per unit area of said external-light absorbing layer is set in a range from 65% to 75%.

6. A method for producing a screen unit for a rear projection display apparatus including a single projection lens, having improved contrast with reduced scintillation, comprising the steps of:

providing a Fresnel lens for gathering incident image light;

providing a lenticular lens for causing the image light gathered by said Fresnel lens to be incident thereon and having an external-light absorbing layer on an emergent side thereof;

providing a light diffusing structure for diffusing the image light incident on said lenticular lens;

providing a desired light diffusion property representing a desired haze in a range between 60% and 80% caused by the light diffusing structure; and selecting a covering ratio per unit area of said external-light absorbing layer in said lenticular lens based on a diffusion property represented by said haze, so that rays from said lenticular lens, which are within an emergent angle at which luminance is a predetermined luminance, can pass through.

7. The method according to claim 6 wherein said predetermined luminance is approximately one-tenth of peak luminance.

8. The method according to claim 6 including the step of creating said light diffusing structure and setting said desired haze by mixing a light diffusing agent in said Fresnel lens.

9. The method according to claim 6 including the step of forming said light diffusing structure and setting said desired haze by employing a light diffusing sheet placed before said Fresnel lens.

10. The method according to claim 6 wherein said covering ratio per unit area of said external-light absorbing layer is set in a range from 65% to 75%.

11. A rear projection display apparatus comprising:

an image source including a single projection lens for projecting a desired image light;

a transmissive screen unit including a Fresnel lens for gathering the image light, a lenticular lens for causing the image light gathered by said Fresnel lens to be incident thereon and having an external light-absorbing layer on the emergent side thereof, and a light diffusing structure for diffusing the image light incident on said lenticular lens; and said light diffusing structure having a light diffusion property of haze from 60% to 80%, and said external-light absorbing layer on said lenticular lens having a covering ratio per unit area which is set at a maximum value based on said haze so that rays from said lenticular lens, which are within an emergent angle at which luminance is a predetermined luminance, can pass through.

12. The rear projection display apparatus according to claim 11 wherein said light diffusing structure is formed by mixing a light diffusing agent in said Fresnel lens.

13. The rear projection display apparatus according to claim 11 wherein said light diffusing structure is a light diffusing sheet placed before said Fresnel lens.

14. The rear projection display apparatus according to claim 11 wherein the covering ratio per unit area of said external-light absorbing layer is set at 65% to 75%.

15. The rear projection display apparatus according to claim 11 wherein said covering ratio per unit area of external-light absorbing layer on said lenticular lens is set so that rays from said lenticular lens within emergent angle at which luminance is approximately one-tenth of peak luminance, can pass through.

* * * * *